(12) United States Patent
Xu et al.

(10) Patent No.: US 7,324,452 B2
(45) Date of Patent: Jan. 29, 2008

(54) WEIGHTED CREDIT-BASED ARBITRATION USING CREDIT HISTORY

(75) Inventors: Hong Xu, Acton, MA (US); Mark A. W. Stewart, Acton, MA (US)

(73) Assignee: Fujitsu Limited, Kanagawa-ken (JP)

( * ) Notice: Subject to any disclaimer, the term of this patent is extended or adjusted under 35 U.S.C. 154(b) by 1663 days.

(21) Appl. No.: 10/047,467

(22) Filed: Jan. 14, 2002

(65) Prior Publication Data

US 2003/0135449 A1    Jul. 17, 2003

(51) Int. Cl.
*H04L 12/26* (2006.01)
*H04L 12/56* (2006.01)
*H04J 3/16* (2006.01)

(52) U.S. Cl. .................... 370/236; 370/414; 370/468
(58) Field of Classification Search ............. 370/235, 370/236, 412–418, 468
See application file for complete search history.

(56) References Cited

U.S. PATENT DOCUMENTS

| | | | | |
|---|---|---|---|---|
| 5,231,633 A | * | 7/1993 | Hluchyj et al. ............. 370/429 |
| 5,473,604 A | | 12/1995 | Lorenz et al. ............... 370/60 |
| 5,479,407 A | | 12/1995 | Ko et al. .................... 370/94.1 |
| 5,548,581 A | | 8/1996 | Makrucki .................... 370/17 |
| 5,710,549 A | | 1/1998 | Horst et al. ................. 340/825 |
| 5,793,747 A | | 8/1998 | Kline ......................... 370/230 |
| 5,805,577 A | | 9/1998 | Jain et al. ................... 370/234 |
| 5,852,602 A | * | 12/1998 | Sugawara ................ 370/235.1 |
| 5,920,568 A | | 7/1999 | Kurita et al. ............... 370/412 |
| 6,011,775 A | | 1/2000 | Bonomi et al. ............. 370/230 |
| 6,011,776 A | | 1/2000 | Berthaud et al. ........... 370/232 |
| 6,014,384 A | | 1/2000 | Weberhofer ................ 370/455 |
| 6,044,061 A | | 3/2000 | Aybay et al. ............... 370/230 |

(Continued)

FOREIGN PATENT DOCUMENTS

EP    1 162 790 A2    12/2001

(Continued)

OTHER PUBLICATIONS

Fourmaux et al., "Multicast for RSVP Switching—An Extended Multicast Model with QoS for Label Swapping in an IP over ATM Environment", citeseer.nj.nec.com/14326.html, pp. 1-21, (1998).

(Continued)

*Primary Examiner*—Chau Nguyen
*Assistant Examiner*—Hong Sol Cho
(74) *Attorney, Agent, or Firm*—Weingarten, Schurgin, Gagnebin & Lebovici LLP

(57) ABSTRACT

A system for managing data transmission from a number of queues employs a regular credit count and a history credit count for each queue. Generally, the regular credit count is used in arbitration. The count is decreased when data is transmitted from the queue and increased at given intervals if the queue is facing no transmission-blocking backpressure. The history credit count is increased in lieu of the regular credit count when transmission from the queue is blocked. Thus, the history credit count keeps track of potential transmission opportunities that would be lost due to the blocking of transmission from the queue. The history credit counts are periodically polled instead of the regular credit counts to give each queue an opportunity to catch up in its use of transmission opportunities.

16 Claims, 3 Drawing Sheets

U.S. PATENT DOCUMENTS

| | | | |
|---|---|---|---|
| 6,084,856 A | 7/2000 | Simmons et al. | 370/235 |
| 6,104,724 A | 8/2000 | Upp | 370/458 |
| 6,118,791 A | 9/2000 | Fichou et al. | 370/468 |
| 6,172,963 B1* | 1/2001 | Larsson et al. | 370/229 |
| 6,229,789 B1 | 5/2001 | Simpson et al. | 370/235 |
| 6,260,073 B1* | 7/2001 | Walker et al. | 709/249 |
| 6,359,861 B1* | 3/2002 | Sui et al. | 370/230 |
| 6,992,984 B1* | 1/2006 | Gu | 370/235 |
| 2002/0048280 A1* | 4/2002 | Lee et al. | 370/468 |
| 2003/0112817 A1* | 6/2003 | Woo et al. | 370/413 |
| 2003/0135449 A1* | 7/2003 | Xu et al. | 705/38 |
| 2004/0179535 A1* | 9/2004 | Bertagna | 370/395.21 |

FOREIGN PATENT DOCUMENTS

| | | |
|---|---|---|
| WO | WO 01 78420 A1 | 10/2001 |

OTHER PUBLICATIONS

Katevenis et al., "Weighted Round-Robin Scheduler using Per-Class Urgency Counters", htp://www.ics.forth.gr/proj/arch-visi/muqpro/classSch.html, pp. 1-4, (1997).

Romano et al., "Integrated QoS Architecture for IP Switching", citeseer.nj.nec.com/romano97integrated.html, pp. 1- , (1997).

Zukerman et al., "A Framework for Real-Time Measurement-Based Connection Admission Control in Multi-Service Networks", Proceeding of IEEE, Global Telecommunications Cionference Globe GM, vol. 5 of 6, pp. 2983-2988, (1998).

M. Shreedhar, et al., "Efficient Fair Queuing Using Deficit Round-Robin", Jun. 1996, IEEE, vol. 4, No. 3.

* cited by examiner

WEIGHTED CREDIT-BASED ARBITRATION USING CREDIT HISTORY

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention is related to the field of data communications apparatus, and more particularly to apparatus employing credit-based arbitration for the use of a shared data transmission resource.

Arbitration techniques are utilized in data communication apparatus when there are multiple users of a shared resource. For example, there may be multiple queues containing data packets that are to be transmitted over some common data path within the apparatus. Arbitration is used to ensure that the transmission capacity of the data path is properly shared among the various queues. The data path may be shared according to a relatively simple criteria, such as allocating an equal share of capacity to each queue, or may be shared according to more complex criteria, such as allocating generally different peak and average shares to each queue.

A known arbitration technique is so-called "round-robin" arbitration. Each time an arbitration operation is performed, a pointer is used to identify the queue having the highest priority for the resource, and the other queues are given lower priority. The pointer is advanced in a predetermined fashion once per arbitration cycle, so that the status of "highest priority" is given to each queue in turn. Assuming that each queue can make full use of every arbitration that it wins, the round-robin scheme promotes fair use of the shared resource by all the queues.

It is also known to employ transmission "credits" in managing access to a shared resource. In credit-based schemes, a credit count is associated with a queue or other source of data. A queue is eligible to use the shared resource as long as it has sufficient credits. The credits are decremented by an appropriate amount whenever data is transmitted from the queue, and the credits are incremented periodically in accordance with some pre-specified criteria. Credit-based schemes can be useful to achieve a complex mix of traffic from multiple sources on a shared data path. Different periodic credit allocations can be made to different queues to reflect different shares of the data path transmission capacity. The use of credits in this manner can be referred to as "weighted" credit-based arbitration.

In certain applications, there can be drawbacks to using weighted round-robin arbitration for the purpose of accurately allocating the use of a shared datapath among a number of users. For example, if there is a possibility of contention for further-downstream resources, there may be times when transmission from one queue is prevented due to such contention, even though the queue has the highest priority for use of the datapath. This condition can be referred to as "backpressure". Alternatively, the traffic flowing into a given queue may be particularly "bursty", i.e., it may have a high ratio of peak-to-average data rates. Such a queue may be empty at times it attains the highest-priority arbitration status. In either case, transmission capacity allocated to the queue is not used by the queue, and thus is wasted or used by the other queues as excess capacity. Such operation effectively distorts the resource allocation scheme, resulting in actual operational behavior that may deviate significantly from desired behavior. In particular, users of the apparatus may experience actual performance that falls short of advertised or otherwise expected performance, with the attendant problems of unmet expectations.

BRIEF SUMMARY OF THE INVENTION

In accordance with the present invention, methods and apparatus are disclosed for managing the transmission of data traffic from a number of queues in a manner that can improve the ability of data communication equipment to provide an expected level of performance despite the presence of conditions, such as burstiness in data flows, that might otherwise degrade performance.

In the disclosed method, a regular credit count and a history credit count are maintained for each of the queues. The regular credit counts are generally used to identify candidates for arbitration. A queue is identified as a candidate if data transmission from the queue is not blocked and the queue has a regular credit count greater than some predetermined minimum value, such as zero. The regular credit count of a queue is decreased when data is transmitted from the queue after having won the subsequent arbitration. The regular credit count is increased by a queue-specific weight periodically, as long as data transmission from the queue is not blocked. For example, in a system in which the queues are subject to backpressure that can temporarily block transmission from the queue, the regular credit count is increased at a given time if no backpressure is present.

The history credit counts are also used to identify candidates for arbitration, but in a slightly different way. A selection mechanism is used to periodically poll the history credit counts rather than the regular credit counts. The identification of candidates, arbitration, and decreasing of the history credit count are performed in essentially the same way as for regular credit counts. However, the history credit count is increased in a different manner. The history credit count is increased in lieu of increasing the regular credit count when transmission from the queue is blocked. Thus, the history credit count keeps track of potential transmission opportunities that would be lost due to the blocking of transmission from the queue by some non-arbitration mechanism, such as backpressure. The periodic polling of the history credit counts instead of the regular credit counts gives each queue an opportunity to "catch up" in its use of transmission opportunities, improving the fairness with which transmission bandwidth is used by all the queues.

Other aspects, features, and advantages of the present invention will be apparent from in the detailed description that follows.

BRIEF DESCRIPTION OF THE SEVERAL VIEWS OF THE DRAWING

The invention will be more fully understood by reference to the following Detailed Description of the invention in conjunction with the Drawing, of which.

DETAILED DESCRIPTION OF THE INVENTION

Figure 1:
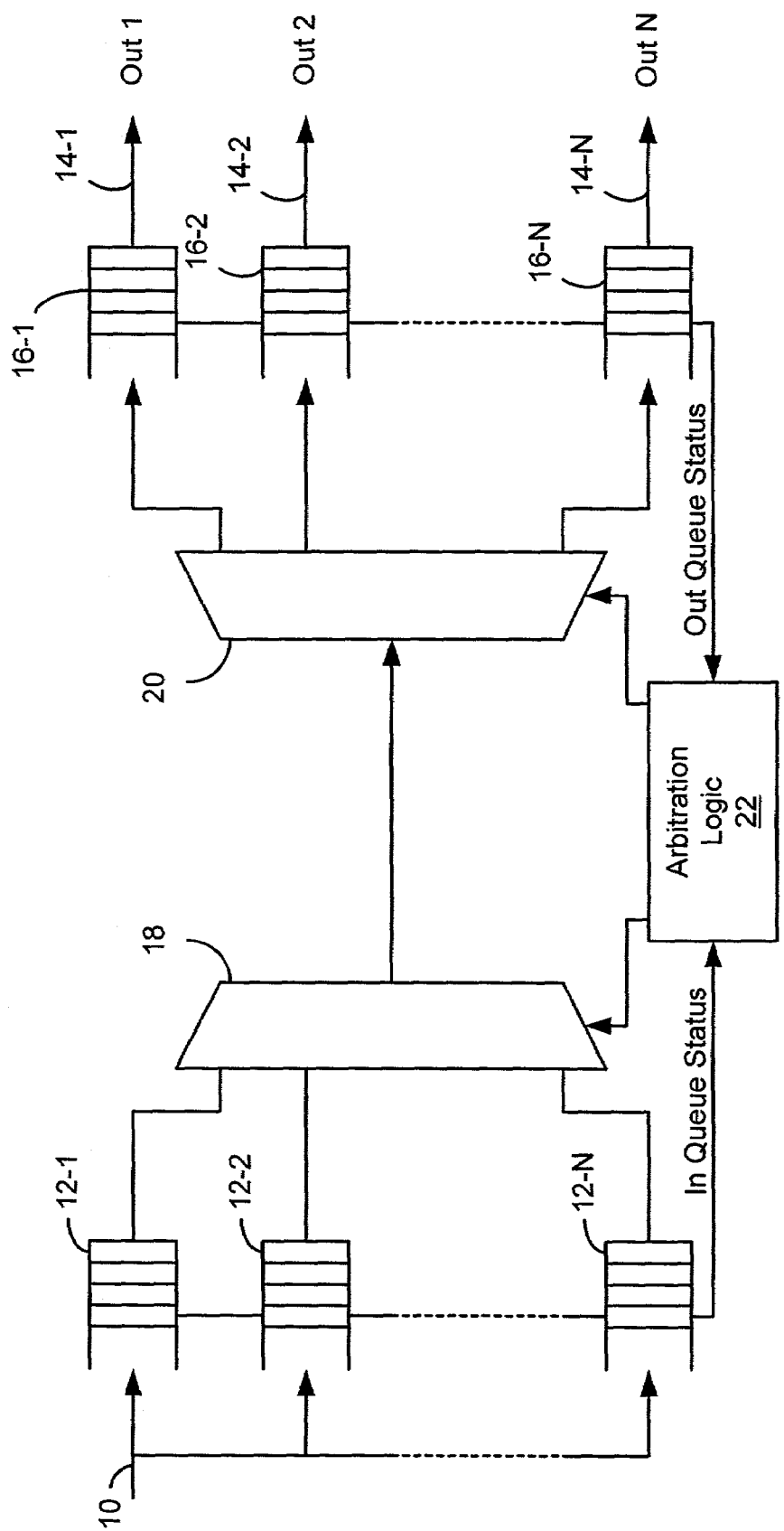
FIG. 1 is a block diagram of a system having queues for different destinations via a shared datapath in accordance with the present invention.

FIG. 1 shows a portion of a network switch in which data packets or cells received at an input 10 are stored in one of several input queues 12-1, 12-2, . . . , 12-N depending on which of corresponding outputs 14-1, 14-2, . . . , 14-N the packet or cell is destined for. For convenience, the remainder of this description uses the term "packet" to refer to message units within the switch of FIG. 1 or a network in which it operates, whether such units are of variable size or of fixed size. Associated with each output 14 is a corresponding output queue 16. Between the two sets of queues 12 and 16 is a shared datapath including a multiplexer 18 and a demultiplexer 20. The multiplexer 18 and demultiplexer 20 are controlled by arbitration logic 22, which carries out its operations in part based on queue status information shown as IN QUEUE STATUS and OUT QUEUE STATUS.

In operation, received packets are examined to determine the output 14 to which each packet is to be forwarded, and each packet is placed in the corresponding input queue 12. Thus, for example, if a received packet is determined to be destined for output 14-2, the packet is placed in input queue 12-2. The determination of the proper destination within the switch, commonly referred to as "forwarding", can be done in any of a variety of ways known in the art.

The arbitration logic 22 is responsible for monitoring the input queues 12 to identify those having packets to be forwarded, and monitoring the output queues 14 to determine which ones are capable of accepting forwarded packets. Additionally, the arbitration logic 22 carries out a predetermined algorithm for identifying "candidate" input queues 12, i.e., those that are eligible for forwarding packets, and selecting from among the candidates in a manner that furthers certain operational goals of the switch. These goals generally fall in the realm of "traffic shaping", i.e., controlling peak and average transmission rates of a number of streams while maximizing the efficient use of available transmission bandwidth. Specific processes carried out by the arbitration logic 22 are described below.

Once a packet has been transferred from an input queue 12 through the multiplexer 18 and demultiplexer 20 to an output queue 16, it is transmitted to the corresponding output 14 upon reaching the head of the output queue 16. Thus, packets delivered to output queue 16-2, for example, work their way in a first-in-first-out (FIFO) fashion to the head of the queue 16-2 and then are transmitted on a network link (not shown) connected to the output 14-2.

Figures 2, 4:
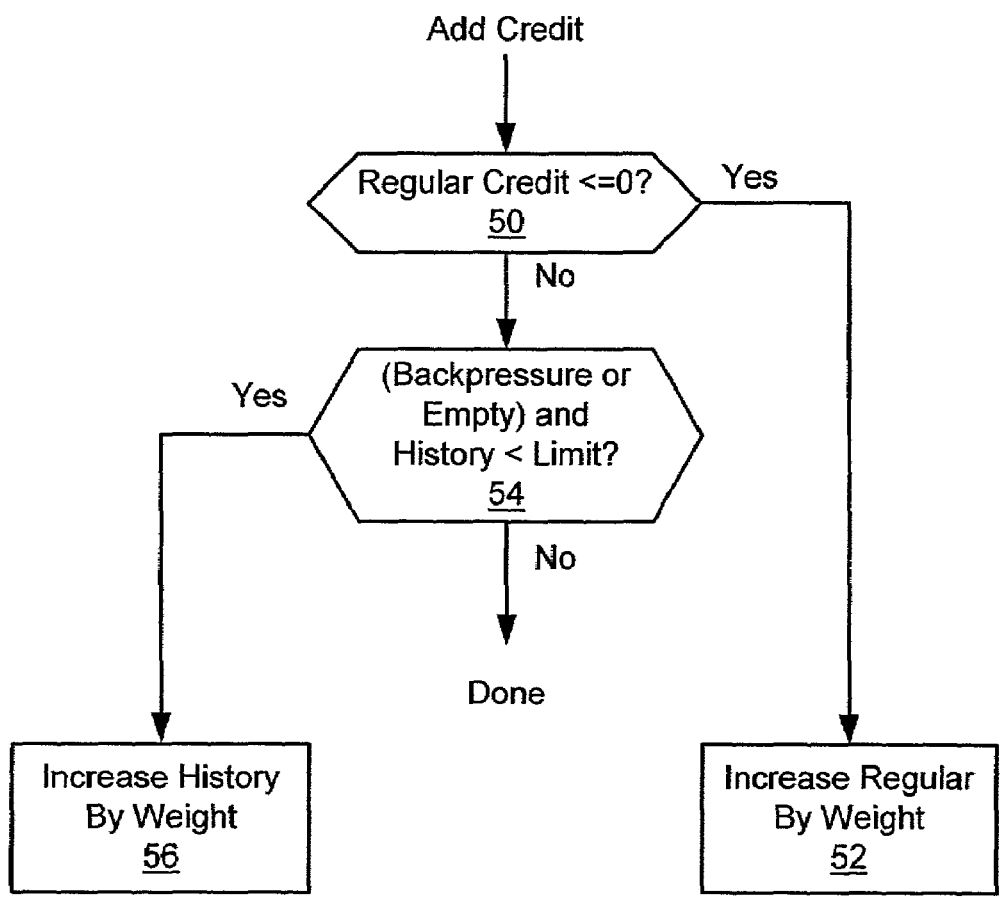
FIG. 2 is a diagram of a credit window data structure associated with each queue in the system of FIG. 1.
FIG. 4 is a flow diagram of a process for adding transmission credits to the credit window data structure of FIG. 2.

FIG. 2 shows a data structure used in connection with the operation of the system of FIG. 1, particularly the operations of the arbitration logic 22. One such data structure is maintained for each input queue 12. The structure includes a regular credit count 24, a history credit count 26, a weight 28, a transmit size 30, and a limit 32. In one embodiment, the regular credit count 24 is preferably a signed, multi-bit integer, whereas the other data elements are preferably unsigned values. The regular credit count 24 tracks the number of transmission credits of a first type, referred to herein as "regular" credits, that have been accumulated on behalf of the corresponding input queue 12. These regular credits are added to the count under certain circumstances, as described below. The history credit count 26 tracks the number of transmission credits of a second type, referred to as "history" credits", that have been accumulated by the corresponding queue, the history credits being added to the count under different circumstances as described below. The regular and history credit counts 24, 26 are also used differently in the arbitration process, as also described below.

The weight 28 is a provisioned parameter that indicates the relative priority of the traffic from the corresponding input queue 12 versus the traffic of the other input queues 12. The transmit size 30 is also an operational parameter that corresponds to the number of bytes or data units that are "dequeued", or transmitted from an input queue 12, at one time when the input queue 12 wins an arbitration. The limit 32 establishes a maximum value that can be attained by the history credit count 26. It is preferably a configurable parameter to enable a degree of "tuning" of the arbitration algorithm, as described in more detail below.

Figure 3:
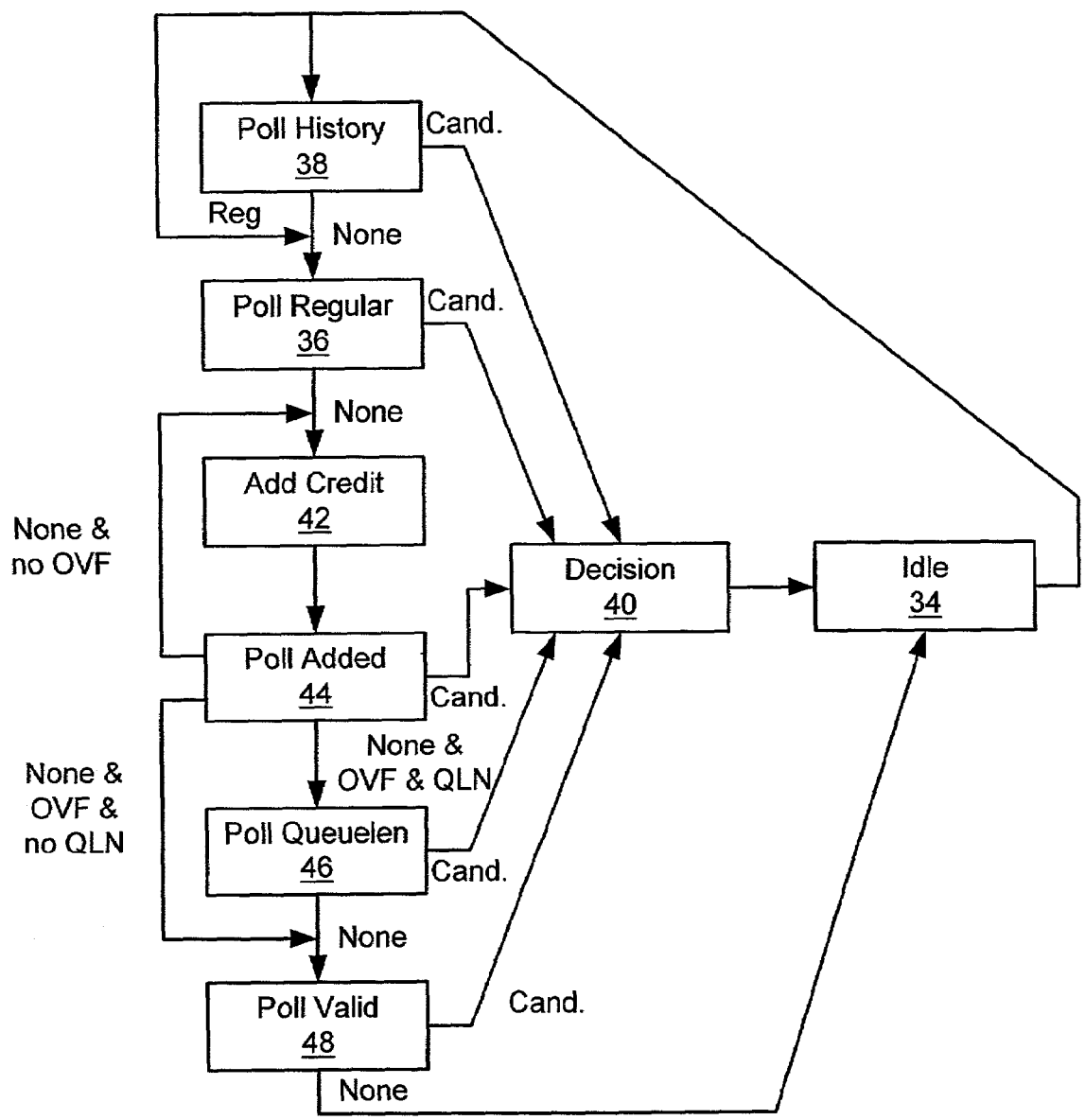
FIG. 3 is a flow diagram of a process for identifying queues as candidates for arbitration and selecting one of the candidate queues for transmitting data in the system of FIG. 1.

FIG. 3 shows the operation of the arbitration logic 22 when identifying candidates for transmission and selecting among the identified candidates. The cycle begins in an idle state 34. An external mechanism (not shown) is used to transition the process into either a state 36 in which regular credits are polled or a state 38 in which history credits are polled. This mechanism may be, for example, a shift register programmed with a binary pattern to reflect a desired proportion of starting in either state 36 or 38. For example, each "1" in the pattern may indicate that regular credits are to be polled, whereas each "0" indicates that history credits are to be polled first. The relative numbers of "1"s and "0"s then indicates the desired proportion of these activities. A number such as "11110" indicates that history credits should be polled one out of five arbitration cycles, whereas a number such as "11100" indicates that history credits should be polled two out of five arbitration cycles. The shift register is shifted once each arbitration cycle, and the value of a bit at some predetermined position (e.g., the most significant bit) provides the indication. Of course, other mechanisms for directing the process to the desired starting state 36 or 38 can be used.

When the process starts in the Poll History state 38 the history credit value 26 (FIG. 2) for each input queue 12 is examined. Every input queue 12 having a history credit value greater than zero is identified as a candidate for arbitration. If one or more such candidates are found, the process transitions to a Decision state 40, which is described below.

The process may enter the Poll Regular state 36 either directly from the Idle state 34 (via an external mechanism as described above) or from the Poll History state 38 when no candidates are identified (i.e., all of the input queues 12 have zero history credits 26). In the Poll Regular state 36, the regular credit counts 24 for each input queue are examined, along with status signals indicating whether the input queue is empty and whether the corresponding output queue 16 is asserting a "backpressure" signal indicating that it cannot currently accept a transfer. All input queues 12 that have a regular credit count 24 greater than zero, and are not empty and not experiencing backpressure, are identified as candidates for arbitration. If at least one such candidate is found, the process transitions to the Decision state 40.

If no candidates are found in the Poll Regular state 36, the process proceeds to the Add Credit state 42. In this state, the credits for each input queue 12 are conditionally increased in a manner described below. The process then proceeds to a Poll Added state 44.

In the Poll Added state 44, the regular credit counts 24 for each input queue are again examined, along with the queue empty and backpressure status signals. All input queues 12 that have a regular credit count 24 greater than zero, and are not empty and not experiencing backpressure, are identified as candidates for arbitration. If at least one candidate is found, the process transitions to the Decision state 40. If no candidates are found, one of several things may happen. If the loop formed by steps 42 and 44 has not been repeated more than some acceptable maximum number of times, indicated as "OVF" for "overflow", then the process returns to step 42 and the loop is repeated. If the loop repetition has overflowed, the process will proceed to either a Poll Queuelen state 46 or a Poll Valid state 48, depending on the setting of a control variable QLN indicating whether the identification of candidates based on queue length is to be undertaken. The variable QLN may be controlled by a supervisory processor (not shown) in the system.

In the Poll Queuelen state 46, those input queues 12 having a queue length greater than some specified value are identified as candidates. If any are found, the process proceeds to the Decision state 40. Otherwise, the process proceeds to the Poll Valid state 48.

In the Poll Valid state 46, those input queues 12 that are not empty are identified as candidates. If any are found, the process proceeds to the Decision state 40. Otherwise, the process returns to the Idle state 34.

The polling of queue length and non-empty status are provided to make use of transmission capacity that might go unused based on the credit counts 24 and 26 alone. Either of these polls may result in the identification of a candidate queue, even though the queue does not have sufficient regular or history credits to qualify as a candidate on that basis.

In the Decision state 40, one of the identified candidates is selected on a round-robin basis. The identity of the highest priority input queue 12 advances in order among the queues during each arbitration cycle, and the remaining queues are ranked in corresponding order. Thus, during one arbitration cycle, for example, priorities of 1, 2, . . . 12 are given to queues 4, 5, 12, 1, 2, and 3, respectively. During the next arbitration cycle, the priorities shift to queues 5, 6, . . . , 12, 1, 2, 3, and 4, respectively. During any given arbitration cycle, the highest-priority queue that is identified as a candidate is chosen as the winner of the arbitration. Some number of data units are then transferred from the winning input queue 12 to the corresponding output queue 16. At the same time, either the regular credit count 24 or the history credit count 26 for the winning queue is decreased by an amount corresponding to the number of data units that are transferred, as indicated by the transmit size value 30. The history credit count 26 is decremented if the Decision state 40 was entered via the Poll History state 38; otherwise, the regular credit count 24 is decremented.

FIG. 4 shows the manner in which credits are conditionally added to the regular credit count 24 and history credit count 26 for each input queue 12. The process of FIG. 4 occurs for each input queue 12 each time the process of FIG. 3 passes through the Add Credit state 42.

In step 50, it is determined whether the regular credit count 24 is less than or equal to zero. If so, the regular credit count 24 is increased in step 52 by the weight 28 (FIG. 2). This action may or may not increase the regular credit value 24 to greater than zero. If it does, then the corresponding queue may be identified as a candidate during the Poll Regular state 36 or Poll Added state 44 in a subsequent pass of the process of FIG. 3. In the illustrated embodiment, the value of zero is a convenient upper threshold for determining when to stop increasing the regular credit count 24. It may be advantageous to employ a different upper thresholds in alternative embodiments.

Again referring to FIG. 4, if in step 50 the regular credit count 24 is already greater than zero, then the process proceeds to step 54, in which it is determined whether the queue is either facing backpressure or is empty, indicating that the queue cannot currently make use of any new credits. If either condition exists, and the history credit count 26 is less than the limit 32, the process proceeds to step 56, in which the history credit count 26 is increased by the weight 28. This operation is responsible for the accumulation of credits in the history credit count 26 up to the value of the limit 32, which accumulated credits are used in the Poll History state 38 in the process of FIG. 3. As a result, the corresponding input queue 12 has an opportunity to "catch up" in its use of credits despite the occurrence of conditions that might otherwise result in the loss of allocated bandwidth, as described above.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. A method of managing the transmission of data traffic from a plurality of queues, comprising:

maintaining a regular credit count and a history credit count for each of the queues;

periodically polling the history credit counts of the queues to identify candidates for arbitration, a queue being identified as a candidate if data transmission from the queue is not blocked and the queue has a history credit count greater than a first predetermined minimum value;

both periodically and upon identifying no candidates for arbitration by polling the history credit counts, polling the regular credit counts of the queues to identify candidates for arbitration, a queue being identified as a candidate if data transmission from the queue is not blocked and the queue has a regular credit count greater than a second predetermined minimum value;

upon identifying candidates for arbitration based on either the history or regular credit counts, performing arbitration among those queues identified as candidates;

periodically increasing the regular credit count or history credit count of each queue, the regular credit count for a queue being increased when data transmission from the queue is not blocked, the history credit count for a queue being increased when data transmission from the queue is blocked; and decreasing either the regular credit count or history credit count for each queue when data is transmitted from the queue upon winning an arbitration, the history credit count being decreased when the arbitration has been won on the basis of the history credit count, and the regular credit count being decreased when arbitration has been won on the basis of the regular credit count.

2. A method according to claim 1, further comprising:

maintaining a shift register containing a pattern establishing the relative frequencies at which the regular credit count and the history credit count are polled;

periodically shifting the contents of the shift register; and upon each shift of the shift register, determining based on the value of the binary digit at a predetermined position in the shift register whether to poll the history credit count or the regular credit count.

3. A method according to claim 1, wherein data transmission from the queue is determined to be blocked when the queue is either empty or is facing backpressure, and data transmission from the queue is determined not to be blocked when the queue is non-empty and is not facing backpressure.

4. A method according to claim 1, wherein the increasing of the regular credit count and history credit count of each queue occurs upon identifying no candidates during the polling of the regular credit count.

5. A method according to claim 1, wherein performing arbitration comprises performing round-robin arbitration.

6. A method according to claim 1, wherein the first predetermined minimum value is zero.

7. A method according to claim 1, wherein the second predetermined minimum value is zero.

8. A method according to claim 1, further comprising maintaining a history credit limit for each of the queues, and wherein the history credit count for each queue is increased when data transmission from the queue is blocked and the history credit count is less than the history credit limit.

9. A method according to claim 1, further comprising maintaining a weight for each queue, and wherein the increasing of the history credit count and the regular credit count of each queue comprise increasing the credit count by the corresponding weight.

10. A method according to claim 9, wherein the weights maintained for the different queues are generally different.

11. A method according to claim 1, wherein each queue corresponds to a different output of a network device.

12. A method according to claim 1, further comprising re-polling the regular credit count of each queue upon increasing the regular credit count and history credit count of each queue; and upon identifying candidates for arbitration based on the re-polling of the regular credit counts, performing arbitration among those queues identified as candidates.

13. A method according to claim 12, further comprising repeating the increasing of the credit counts, the re-polling, and the conditional performing of arbitration among candidates identified based on the re-polling up to a predetermined maximum number of times.

14. A method according to claim 1, further comprising:

polling the respective lengths of the queues if no candidates are identified upon the polling of the regular credit counts; and upon identifying candidates for arbitration based on the polling of the queue lengths, performing arbitration among those queues identified as candidates.

15. A method according to claim 1, further comprising:

polling the queues to identify those queues containing data, if no candidates are identified upon the polling of the regular credit counts; and upon identifying candidates for arbitration based on identifying queues containing data, performing arbitration among those queues identified as candidates.

16. A network switch, comprising:

a plurality of queues, each queue receiving data from an input of the switch and being associated with a corresponding different output of the switch, each queue including a corresponding regular credit count and history credit count;

data transfer logic operative to transfer data from a selected one of the queues to the corresponding output of the switch; and arbitration logic operative to:

(1) periodically poll the history credit counts of the queues to identify candidates for arbitration, a queue being identified as a candidate if data transmission from the queue is not blocked and the queue has a history credit count greater than a first predetermined minimum value;

(2) both periodically and upon identifying no candidates for arbitration by polling the history credit counts, poll the regular credit counts of the queues to identify candidates for arbitration, a queue being identified as a candidate if data transmission from the queue is not blocked and the queue has a regular credit count greater than a second predetermined minimum value;

(3) upon identifying candidates for arbitration based on either the history or regular credit counts, perform arbitration among those queues identified as candidates;

(4) periodically increase either the regular credit count or history credit count of each queue, the regular credit count for a queue being increased when data transmission from the queue is not blocked, the history credit count for a queue being increased when data transmission from the queue is blocked; and (5) decrease either the regular credit count or history credit count for each queue when data is transmitted from the queue upon winning an arbitration, the history credit count being decreased when the arbitration is won on the basis of the history credit count, and the regular credit count being decreased when arbitration is won on the basis of the regular credit count.

* * * * *

UNITED STATES PATENT AND TRADEMARK OFFICE
CERTIFICATE OF CORRECTION

| | | |
|---|---|---|
| PATENT NO. | : 7,324,452 B2 | Page 1 of 1 |
| APPLICATION NO. | : 10/047467 | |
| DATED | : January 29, 2008 | |
| INVENTOR(S) | : Hong Xu et al. | |

It is certified that error appears in the above-identified patent and that said Letters Patent is hereby corrected as shown below:

Column 5, line 44, "4, 5, 12" should read --4, 5, …, 12--.

Signed and Sealed this

Second Day of September, 2008

JON W. DUDAS
*Director of the United States Patent and Trademark Office*